United States Patent [19]

Eiting

[11] Patent Number: 5,096,326
[45] Date of Patent: Mar. 17, 1992

[54] HYDRAULICALLY EXPANDABLE HUB

[75] Inventor: John C. Eiting, Minster, Ohio

[73] Assignee: Precision Strip Technology, Inc., Minster, Ohio

[21] Appl. No.: 713,440

[22] Filed: Jun. 10, 1991

Related U.S. Application Data

[62] Division of Ser. No. 521,314, May 9, 1991.

[51] Int. Cl.$^5$ .............................................. F16D 1/00
[52] U.S. Cl. ......................................... 403/15; 403/36
[58] Field of Search ...................................... 403/15, 36

[56] References Cited

U.S. PATENT DOCUMENTS 4,525,916  7/1985  Wuhrer ........................... 403/15 X
4,541,163  9/1985  Eiting ................................ 29/426.5

Primary Examiner—Andrew V. Kundrat
Attorney, Agent, or Firm—Wood, Herron & Evans

[57] ABSTRACT

A hydraulically expandable hub having a collection groove and a vent port to prevent the leakage of oil upon the shaft to which the hub is mounted and a method for using such a hub is disclosed. The oil collection groove is located along the inside diameter of the hub between each end of the hub and the oil groove also located on the inside diameter of the hub. A vent port is connected to the collection groove so a vacuum source can be coupled to the hub. The negative pressure produced by the vacuum source at the collection groove sweeps or pulls oil seepage from the oil groove into the collection groove which is transported to the hub exterior through the vent port. Such a hub can be altered in position about the shaft without leaving oil residue along the shaft.

10 Claims, 1 Drawing Sheet

HYDRAULICALLY EXPANDABLE HUB

This is a division of application Ser. No. 521,314, filed May 9, 1990.

FIELD OF THE INVENTION

This invention relates to hydraulically expandable hubs or so-called "hydraulic hubs" and more particularly to an improved method and apparatus for preventing oil used for expanding the hydraulic hub from leaking onto the shaft or arbor upon which the hub is mounted.

BACKGROUND OF THE INVENTION

Hydraulically expanded hubs are well known to the prior art. Such hubs operate upon the principle of expanding the diameter of the hub by application of hydraulic pressure to the interior surface of the hub so as to enable the expanded hub to slide over the surface of a shaft. The hydraulic pressure is applied through a chamber defined between a groove in the interior of the hub and the outside diameter of the shaft over which the hub is to slide. Upon removal of the pressure, the hub contracts and conforms to the diameter of the arbor or shaft, thereby frictionally securing the hub to the shaft. This type of hydraulic hub is disclosed for example in British Patent No. 1,574,421 wherein the hub has a conventional slitting knife secured thereon.

Another patent which discloses a similar hydraulic hub and a method for starting the hub onto a shaft is U.S. Pat. No. 4,541,163. This patent is assigned to the assignee of this application and the disclosure of this patent is hereby incorporated by reference for purposes of completing the disclosure of a hub and shaft of the type to which this invention is applicable. According to the disclosure of this patent, after the hub is started onto the shaft, hydraulic pressure is applied to the interior of the hub through a groove on the interior of the hub. While the hub is expanded by the hydraulic pressure, it is axially moved and positioned on the shaft. After the hub has been moved to its ultimate axial position, which is typically determined by tolerances as close as 0.001", the hydraulic pressure is removed to lock the hub to the shaft at the new position.

For some applications a problem occurs when the hydraulic fluid used to expand the hub leaks from between the hub and the outside diameter of the shaft during the positioning of the hub on the shaft. This oil, while minimal in quantity, adheres to the shaft and may, during subsequent rotation of the shaft, be distributed over a work area by centrifugal force resulting from rotation of the shaft. Part of this oil may be splattered onto a workpiece or material to be worked by the tool connected to the hub. When the material to be worked is one which must be absolutely free of oil, as for example, a sheet of metal used to fabricate cans for the food industry, this oil contamination is a very serious problem.

Currently, to prevent the contamination of such work material surfaces, meticulous cleaning of the shaft must be performed after positioning of the hub, to remove all vestiges of oil from the shaft. This process is quite time consuming and adds additional labor to the process of moving the hydraulic hub from one position along the shaft to another. Furthermore, careful attention must be observed in the removal of the oil from the shaft to prevent any possible contamination of a workpiece from occurring.

It has therefore been an objective of this invention to prevent the laborious and time consuming process of removing oil from a shaft after axial positioning of a hydraulic hub on the shaft.

It has been a further objective of the present invention to prevent the contamination of workpieces resulting from splattering of oil from a shaft upon which hydraulic hubs have been positioned.

SUMMARY OF THE INVENTION

These objectives are achieved, and this invention is predicated upon, the concept of providing a radial oil removal groove on either side of the groove used for receiving and distributing hydraulic pressure to the interior of a hydraulic hub. These grooves are connected to a venting port to transport the oil collected in these radial grooves to the exterior of the hub. A suitable conduit connected to the venting port carries the evacuated oil to a holding reservoir. Preferably, the venting port is connected to a vacuum source which pulls air from the area surrounding the two ends of the hub to form a pneumatic barrier which sweeps or pulls any potential seepage along the shaft into the radial oil removal grooves. The oil may then be evacuated through the venting port.

In the use of this improved hub, the operator activates the hydraulic pressure and the vacuum source at substantially the same time in order to axially move the hub from one position to another along a shaft. As the operator moves the hub along the shaft, the vacuum source pulls air from each end of the hub to one edge of each radial or vacuum groove. This air restrains and contains any oil that has migrated from the hub into the vacuum grooves. The vacuum source then pulls the oil accumulated in the vacuum grooves through the venting port to the reservoir connected by the conduit to the venting port. In this manner, the oil is removed from the shaft without any additional labor on the part of the operator other than that required for movement of the hub and the activation and deactivation of the hydraulic pressure and vacuum sources.

BRIEF DESCRIPTION OF THE DRAWINGS

These and other objects and advantages of this invention will become more readily apparent from the following description of the drawings in which.

DESCRIPTION OF THE PREFERRED EMBODIMENT OF THE INVENTION

Figure 1:
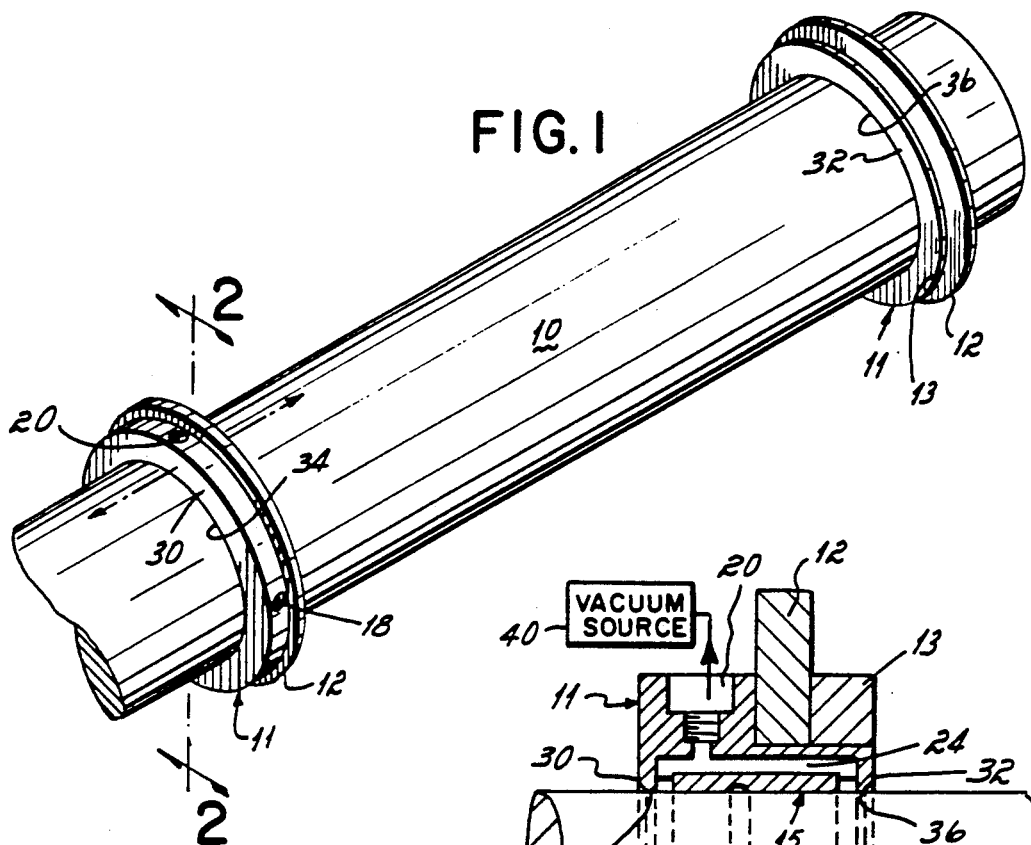
FIG. 1 is a isometric view of a pair of hydraulically expandable hubs embodying the invention of this application mounted upon a shaft or arbor.
Figure 2:
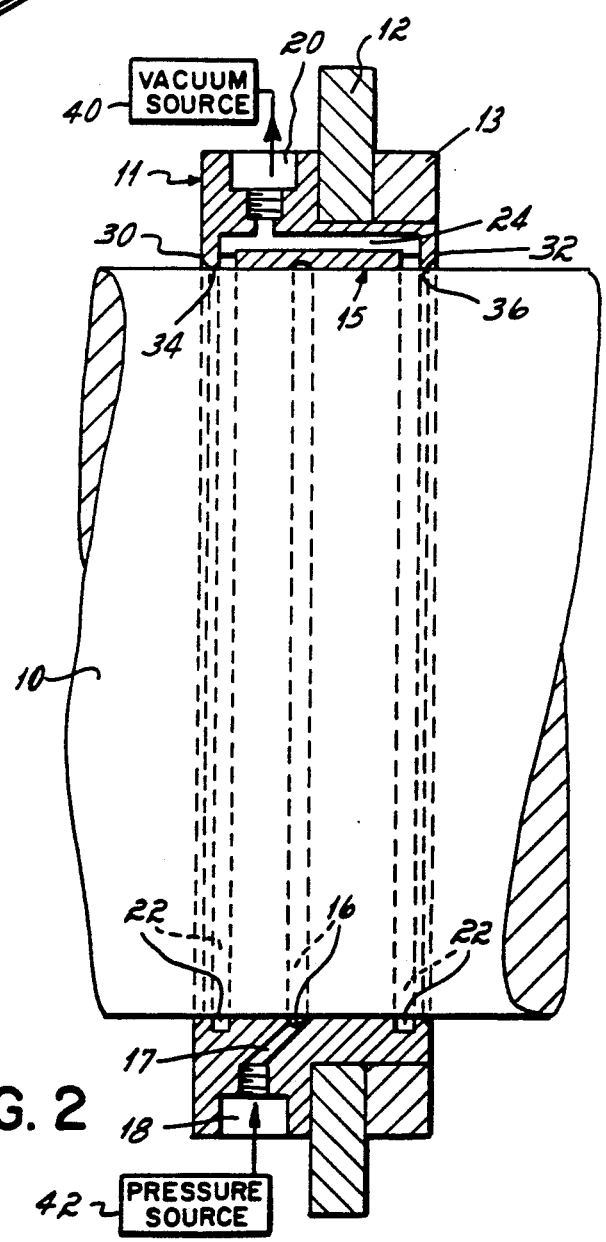
FIG. 2 is a cross sectional view through the arbor and hub of FIG. 1 taken along lines 2—2 in FIG. 1.

Referring first to FIGS. 1 and 2, there is illustrated a shaft or arbor 10 upon which is mounted a pair of hydraulically expandable hubs or so-called hydraulic hubs 11. In the illustrated embodiment, each hub 11 has a slitter knife 12 mounted thereon and secured thereto by a retaining ring 13 and several bolts (not shown). The hub 11 has a bore 15 machined therein which is nominally approximately 0.001" smaller than the nominal outside diameter of the shaft 10.

As shown in FIG. 2, the inside diameter of the hub is provided with an annular groove 16 which is connected via a passage 17 to a port 18 on the periphery of the hub to enable hub 11 to be positioned over shaft 10. Port 18 is adapted to be attached to a source of high pressure fluid 42, on the order of 4,000 p.s.i., when the hub is mounted on the shaft 10. Upon application of this high pressure fluid to groove 16, the hub is expanded in diameter relative to the shaft. So long as this pressure is maintained to port 18, hub 11 may be moved along shaft 10. When this pressure is relieved, the hub reduces in diameter and is thereby fixedly secured to the shaft. A more detailed description of the manner in which hydraulic pressure effects expansion of the hub so as to facilitate movement of the hub over shaft 10 may be found in British Patent No. 1,574,421 or in U.S. Pat. No. 4,541,163.

The invention of this application is concerned with a method and structural improvement in the hydraulic hub to prevent the leakage of oil from the hydraulic hub onto the shaft when the hub is moved from one axial position on the shaft 10 to another. In the absence of the invention of this application, when the hydraulic hub is moved linearly along shaft 10, portions of the hydraulic fluid are left along shaft 10. Unless the shaft is thereafter thoroughly cleaned, when the shaft is rotated to operate the tool connected to the hydraulic hub, this oil may be thrown from the shaft and distributed throughout the immediate vicinity. Some of this oil inevitably lands on the workpiece or work material.

Prior to this invention, whenever the workpiece was required to be maintained absolutely free of oil, the machine operator would have to manually clean shaft 10 with an absorbent material and some sort of solvent to remove the oil after positioning of the hub on the shaft. This procedure added additional labor to the alteration of the machine setup and required a careful eye to determine when all of the oil has been removed from the shaft. Additionally, it required the operator to maintain a supply of absorbent material and solvent for the cleaning of the shaft between positionings. The structural features of the improved hydraulic hub of this invention eliminated the need for the operator to clean the shaft between machine setups when the hydraulic hub is axially displaced along shaft 10.

To prevent the contamination of the work material and the slinging of oil throughout the work area, in accordance with the invention of this application, a venting port 20 is connected to two radial or vacuum grooves 22 which are placed on either side of oil groove 16 along the inside diameter of the hydraulic hub.

With reference to FIG. 2, hub 11 is shown with a pair of square cross-section grooves, one on each side of annular groove 16, along the inside diameter of hub 11. These square grooves 22 are interconnected by a passage 24 to the vent port 20. Note that while FIG. 1 does not show ports 18 and 20 diametrically opposed to each other they are depicted as such in FIG. 2 for purposes of description only.

In one preferred embodiment, the square grooves 22 are 5/32" wide and are cut approximately ⅛" deep into the inside diameter of hub 11. Hub 11 has first 30 and second 32 endmost portions of the bore 15 into which a diameter has been machined that is slightly larger than the inside diameter of hub 11 surrounding the annular groove 16. In this preferred embodiment of the present invention, the hub inside diameter 15 is 6.4972 to 6.4975 inches and the inside diameter 34 at the first end portion 30 located between the vacuum groove 22 and the first end of the hub which is approximately 6.4983" to 6.4985" while the inside diameter 36 at the second end 32 located between the second vacuum groove 22 and the second end of the hub is approximately 6.4978" to 6.4980". The difference between the diameters machined in the first and second end portions 30, 32 of the hub 11 is due to the amount of backing material embodied in the hub 11 at the respective ends. Specifically, the provision of more backing material for the mounting of the tool or knife 12 and for placement of vent port 20 and vacuum port 18 strengthens hub 11 at its first end portion 30 causing this end to resist the expansion force of the hydraulic fluid forced into annular groove 16 to a greater extent than the more flexible second end portion 32. Consequently, this portion of the hub will not expand as greatly as the portion of the hub adjacent the second end 32. To accommodate this difference in expansion properties of the two respective ends the diameters at the ends vary slightly so that an overall roughly equivalent expansion size is provided for hub 11 when hydraulic pressure is applied to annular groove 16.

With further reference to FIG. 2, passage 24 is preferably ⅛" wide. Vent port 20 is constructed to accommodate a fitting attached to a conduit to couple a vacuum source supplying approximately 10" of mercury negative pressure. Such a fitting is well known in the art.

As shown in FIG. 2, the square grooves 22 are each respectively located a predetermined distance from the respective ends 30 and 32 of hub 11. In the preferred embodiment of the present invention, this distance from the ends of hub 11 is approximately ⅛". This distance is important since it must be sufficiently small to permit the negative pressure within the square grooves to pull atmospheric air adjacent the ends of hub 11 into the square grooves, but not close enough to permit the oil which migrates into the square groove from annular groove 16 to escape beyond the edge of the hub 11.

In the operation of the hydraulic hub 11, an operator applies substantially simultaneously a pressure source 42 to port 18 and a vacuum source 40 to vent port 20. The hydraulic fluid provided by the pressure source fills annular groove 16 and expands the inside diameter of hub 11. The expansion of the inside diameter of hub 11 permits the hub to be easily axially displaced along shaft 10. As the hub 11 is moved along shaft 10, oil migrates from groove 16 along the inside diameter of the hub 11. As the hub moves along the shaft 10, air is pulled into the square grooves 22 from the first and second ends, 30 and 32, by the negative pressure created by the vacuum source coupled to the square grooves through vent port 20. This air flow sweeps or pulls oil accumulating along the shaft into the square groove 22 and the oil in the square grooves 22 follows the air flow through the grooves, passage 24 and vent port 20 to a reservoir (not shown) located outside the hub. An ancillary action which aids in removing oil from the shaft is attributed to the vacuum source itself pulling the oil from the shaft into the square grooves 22 and then through the passage and vent port to the reservoir. The overall effect of these two actions is to remove the oil from shaft 10 as the hub is moved axially along the shaft and transport the oil into the reservoir (not shown).

As can be understood from the above description of the hydraulic hub, the invention makes it possible to move the hydraulic hub from one machine setup to another machine setup without requiring any cleaning of the shaft to prevent the contamination of the work area or the work material from oil which adheres to the shaft. This feature automatically cleans the shaft during movement of the hydraulic hub and eliminates the cleaning step as part of the operator's procedure in preparing the next machine set up.

While I have described my invention as being useful for hydraulically expandable hubs used in conjunction with slitter knives, it is appreciated that this improvement of the hydraulic hub could be used irrespective of the type of tool mounted upon the hub. Therefore, I do not intend to be limited except by the scope of the following appended claims.

I claim:

1. A hydraulically expandable hub having first and second ends and an inside diameter, said inside diameter having an oil groove between said first and second ends for providing oil under high pressure to expand said hub for positioning upon a shaft, said hub being characterized by:

a first collection groove along said inside diameter between said oil groove and one of said first and second ends for collecting oil escaping from said oil groove; and a vent means connected to an exterior surface of said hub for venting said collection groove to said exterior surface of said hub so that oil accumulating within said collection groove is removed from said hub to prevent leaking of said oil from said hub onto said shaft.

2. The hub of claim 1 further comprising:

a second collection groove located along said inside diameter of said hub between said oil groove and the hub end opposite said hub end having said first collection groove.

3. The hub of claim 2 wherein said second collection groove is connected to said vent means so that oil collected in said first and second collection grooves is removed from said hub through said vent means to prevent the leakage of said oil from said hub onto said shaft.

4. A hydraulically expandable hub having first and second ends, an inside diameter, and an external surface, said inside diameter having an oil groove between said first and second ends for providing oil under high pressure to expand said hub for positioning upon a shaft;

a first vacuum groove along said inside diameter between said oil groove and one of said first and second ends; and a vent means for venting said vacuum groove to said outside diameter of said hub so that a vacuum source connected to said vent means pulls oil leaking from said oil groove through said vacuum groove into said vent means to prevent leakage of said oil from said hub.

5. The hub of claim 4 which further comprises:

a second vacuum groove along said inside diameter of said hub located between said oil groove and the hub end opposite said hub end having said first vacuum groove.

6. The hub of claim 5 wherein said second vacuum groove is connected to said first vacuum groove at said vent means so that a vacuum source connected to said vent means pulls oil leaking from said oil groove through said first and second vacuum grooves into said vent means for removal of said oil from said hub.

7. The hub of claim 4 wherein:

said inside diameter of said hub between said oil groove and said first vacuum groove is less than the diameter of said hub between first vacuum groove and one of said first and second ends.

8. The hub of claim 7 wherein:

said inside diameter of said hub at said first and second ends is slightly greater than said inside diameter between said oil groove and said first and second vacuum grooves, respectively.

9. The hub of claim 8 wherein:

said inside diameter of said hub between said first and second vacuum grooves and said first and second ends is less than 0.002 inches greater in diameter than the inside diameter of said hub between said first and second vacuum grooves.

10. The hub of claim 8 wherein:

said inside diameter of said hub between said first and second vacuum grooves and said first and second ends is approximately 0.0005" to 0.0010" greater in diameter than the inside diameter of said hub between said first and second vacuum grooves.

* * * * *